April 28, 1964  C. E. BRANICK  3,130,957
TRUCK TIRE SPREADING AND INVERTING DEVICE
Filed Sept. 26, 1962  6 Sheets-Sheet 1
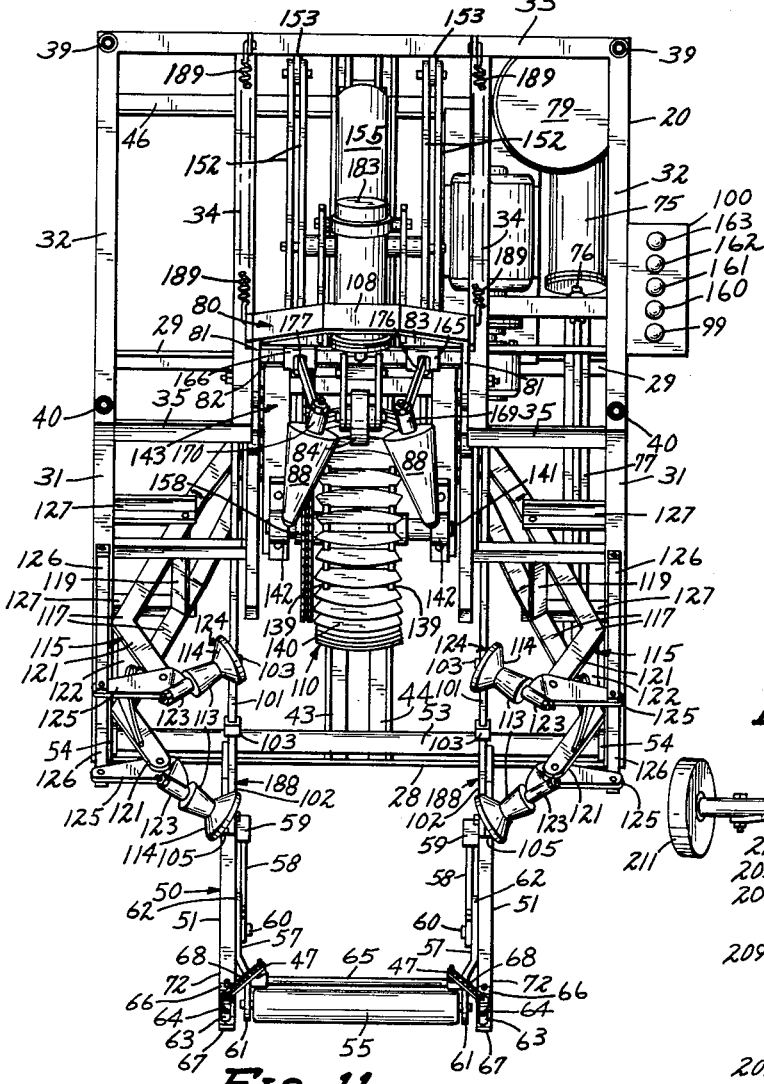
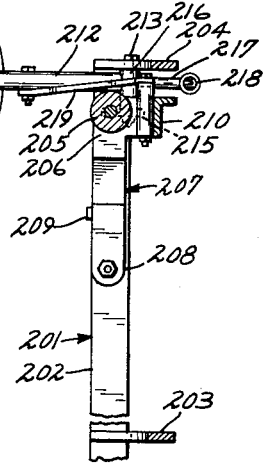
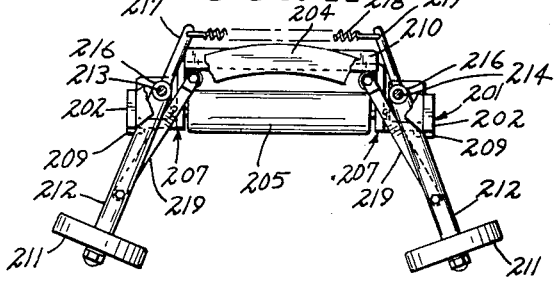
INVENTOR.
CHARLES E. BRANICK
BY
*Merchant, Merchant & Gould*
ATTORNEYS April 28, 1964  C. E. BRANICK  3,130,957
TRUCK TIRE SPREADING AND INVERTING DEVICE
Filed Sept. 26, 1962  6 Sheets-Sheet 2

INVENTOR.
CHARLES E. BRANICK
BY
Merchant, Merchant & Gould
ATTORNEYS

April 28, 1964  C. E. BRANICK  3,130,957
TRUCK TIRE SPREADING AND INVERTING DEVICE
Filed Sept. 26, 1962  6 Sheets-Sheet 3

INVENTOR.
CHARLES E. BRANICK
BY
Merchant, Merchant & Gould
ATTORNEYS

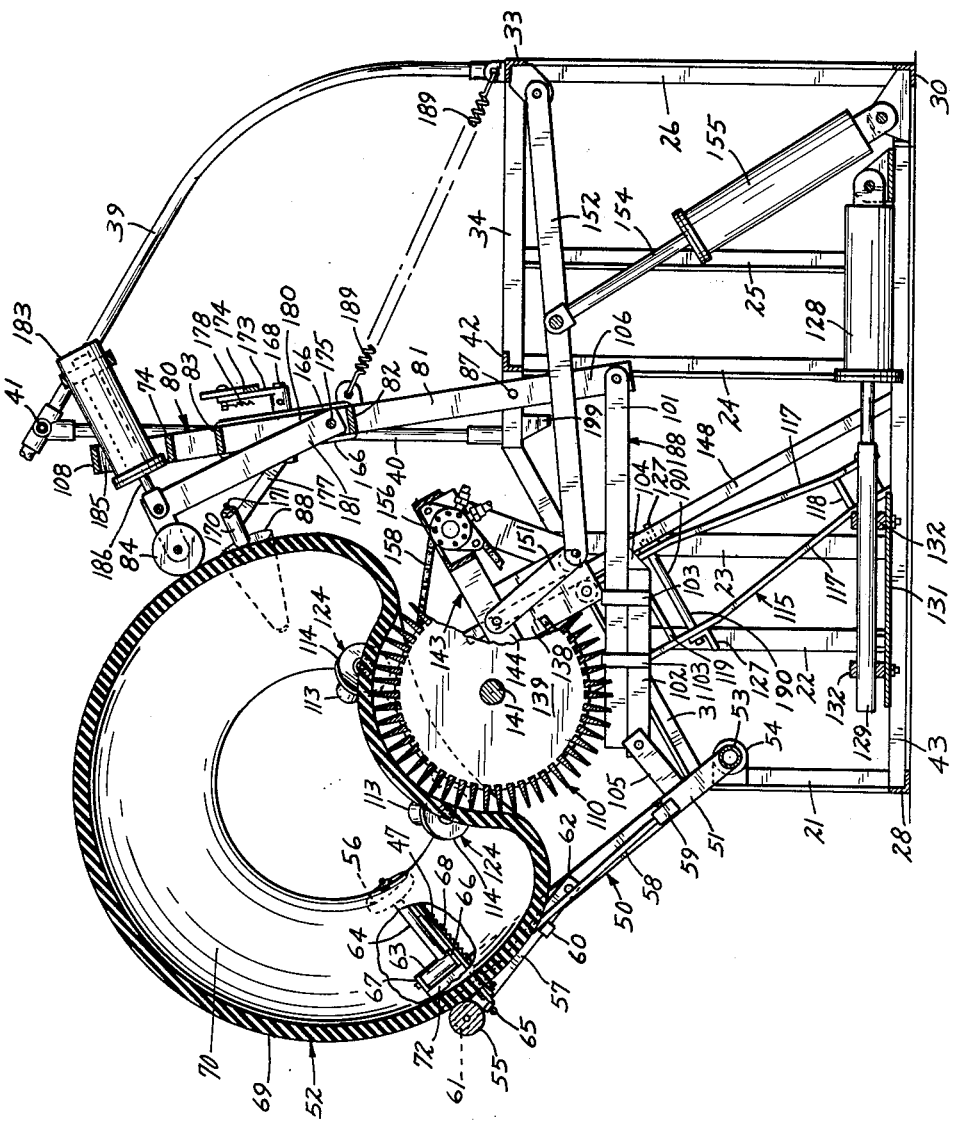

April 28, 1964   C. E. BRANICK   3,130,957
TRUCK TIRE SPREADING AND INVERTING DEVICE
Filed Sept. 26, 1962   6 Sheets-Sheet 5
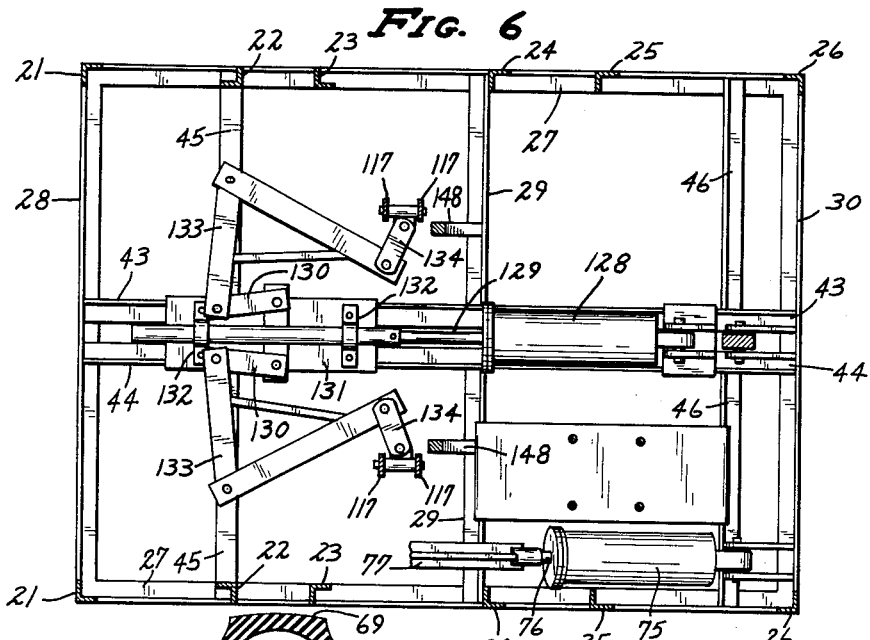
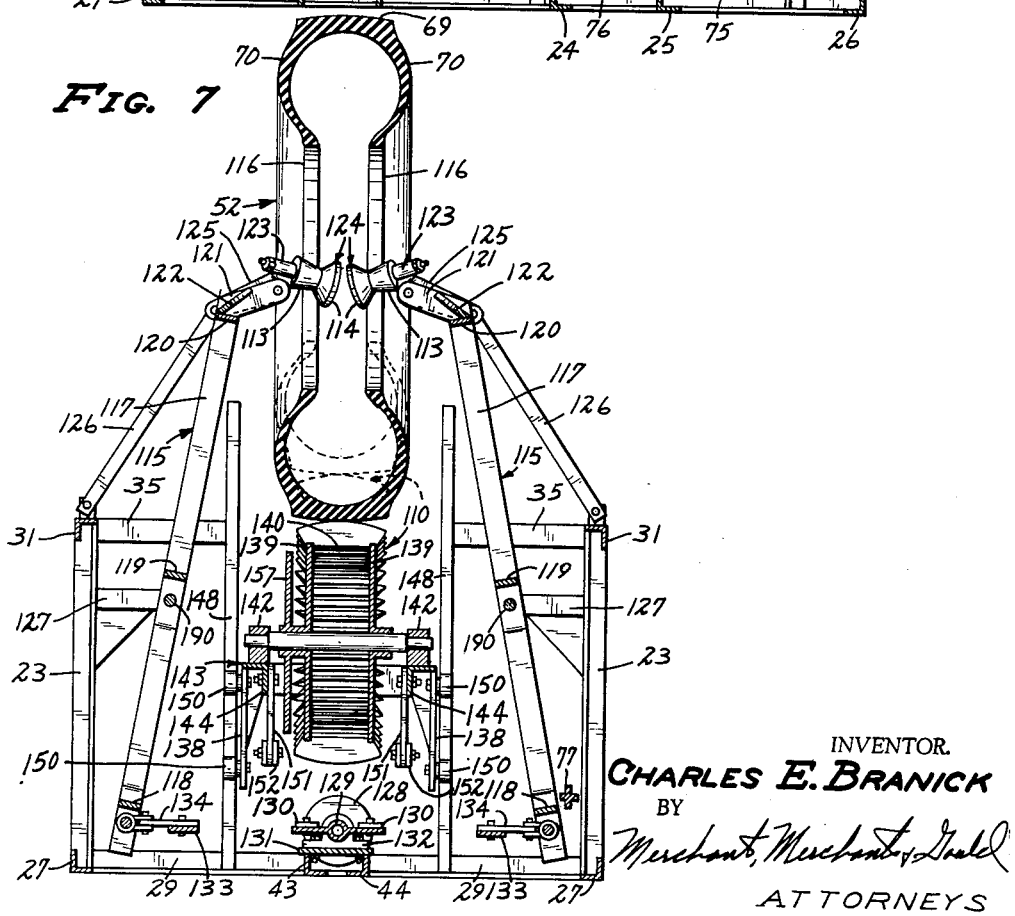
INVENTOR.
CHARLES E. BRANICK
BY
Merchant, Merchant & Gould
ATTORNEYS April 28, 1964 C. E. BRANICK 3,130,957
TRUCK TIRE SPREADING AND INVERTING DEVICE
Filed Sept. 26, 1962 6 Sheets-Sheet 6
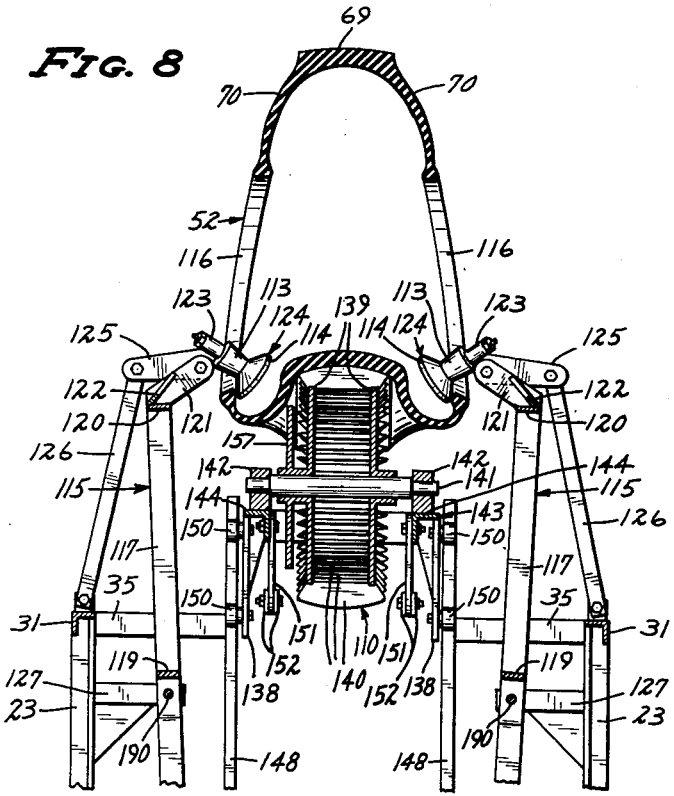
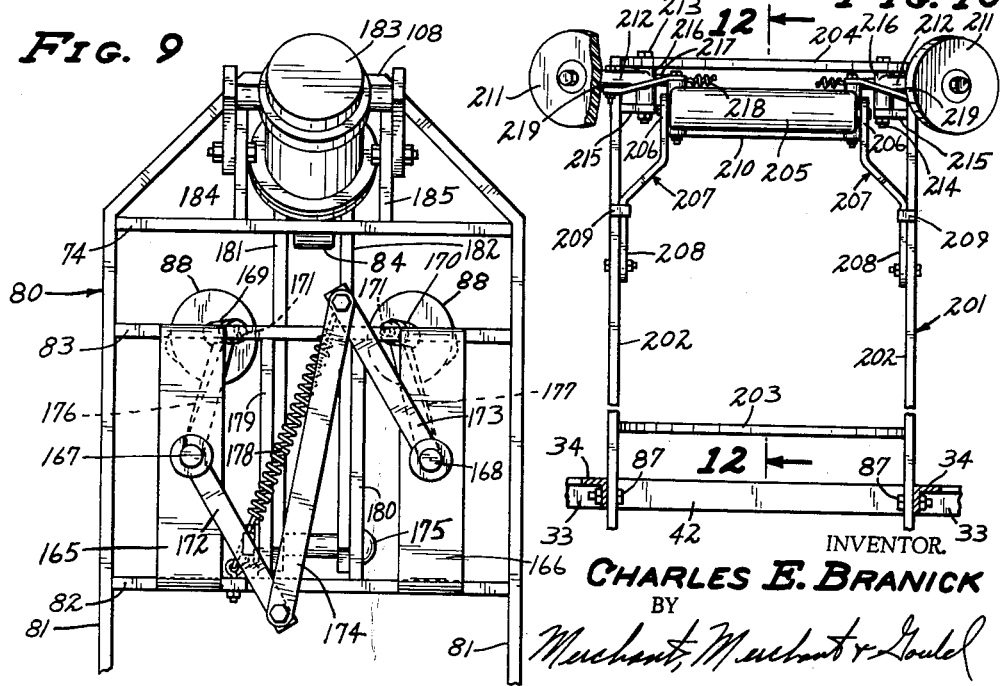
INVENTOR.
CHARLES E. BRANICK
BY
Merchant, Merchant & Gould
ATTORNEYS

United States Patent Office 3,130,957
Patented Apr. 28, 1964

3,130,957
TRUCK TIRE SPREADING AND INVERTING DEVICE
Charles E. Branick, % Branick Mfg. Co., Box 1937, Fargo, N. Dak.
Filed Sept. 26, 1962, Ser. No. 226,291
7 Claims. (Cl. 254—50.3)

This invention relates to improvements in pneumatic tire inspection equipment, and more particularly to improvements in equipment used to invert tire casings for inspection, maintenance, and repair of the inner wall surfaces thereof.

Heretofore, I have shown the construction of tire inspection apparatus for bead spreading, crown inverting, and tire rotation, employing a tire-inverting wheel in combination with tire bead engaging rollers. The tire-inverting wheel is movable in directions generally radial to the tire and also is rotatable on its own axis. The tire bead engaging rollers are physically located adjacent the tire-inverting wheel and are movable in directions generally parallel to the axis of the tire. A tire to be inspected for casing cracks, ply separation, fabric breaks, or other injury, is positioned in the apparatus, the bead-engaging rollers are moved near to one another, the tire inverting wheel is moved against the crown forcing the tire upwards to engage the bead-engaging rollers with the tire beads, the bead-engaging rollers are spread apart, and the inverting wheel moves further against the crown to invert the same. However, so far as I know, no pneumatic tire inspection device of this class has heretofore existed in which the bead engaging rollers for bead engagement and spreading and for tire positioning and retaining are so mounted in the device that the bead engaging rollers maintain a positive, independent desired optimum angle of inclination or attitude with respect to the beads of the tire for each possible bead position independently of average tire size, sidewall coefficients of elasticity, or other tire variables.

Furthermore, to my knowledge, no one has heretofore devised a tire lifting platform for raising a tire while in a vertical position from the floor level to a machine-operative position, thereby avoiding the necessity for manually lifting a tire into such a machine operating position, nor has anyone heretofore devised a tire positioning means co-acting with said tire lifting platform for automatically positioning a tire in a machine operative position suitable for bead spreading crown inverson with the tire rotation.

It is an object of this invention to provide a machine which will hoist the tire from the floor to an operative position, spread its bead portions, invert its road-engaging crown portions, and rotate the tire on a horizontal axis while so spread and inverted.

It is another object of this invention to provide a device of the type set forth having novel means for spreading the bead portions of a tire.

It is another object of this invention to provide the device of the type set forth having novel means for supporting a tire during lifting, spreading, inverting, and revolving.

It is another object of this invention to provide a device of the type set forth having novel means for hoisting a tire in a vertical position from the floor or ground and move it into an operative position for spreading, inverting, and revolving.

It is another object of this invention to provide tire inspection equipment suitable for handling large, heavy duty truck tires.

It is another object of this invention to provide tire bead engaging roll means for a tire-spreading apparatus which will maintain a desired positive, independent attitude towards the beads of a tire for bead engagement and spreading, and tire position retainment.

It is another object of this invention to provide in a pneumatic tire spreading, inverting and revolving apparatus a tire-lifting platform and co-acting tire positioning means which together can raise a tire casing in a vertical position from the floor level and automatically position the same for bead-spreading, tire road-engaging crown surface inverting, and tire rotating.

It is another object of this invention to provide in a single pneumatic tire inspection device automatic means for maintaining the opposed tire bead engaging rollers at an optimum attitude, and means for hoisting and positioning a tire in a machine operative position.

The foregoing as well as other important objects and advantages of my invention will become apparent from the following detailed specification, attached drawings, and appended claims.

Referring to the drawings, which illustrate the invention, and in which like reference characters indicate like parts throughout the several views:

FIG. 1 is a view in plan covering the machine built in accordance with my invention;

FIG. 5 is a vertical section taken substantially along the line 5—5 of FIG. 3, but showing an operative position of the parts during the inverting of a tire;

FIG. 6 is a view partly in plan and partly in horizontal section taken substantially along the line 6—6 of FIG. 2;

FIG. 7 is a fragmentary transverse section taken substantially along the line 7—7 of FIG. 2;

FIG. 8 is a view corresponding to FIG. 7 but showing a different position of some of the components;

FIG. 9 is an enlarged fragmentary view as seen substantially from the line 9—9 of FIG. 2;

FIG. 10 is a view corresponding to FIG. 9, but showing a modified form of the tire positioning means;

FIG. 11 is a view in top plan of the structure shown in FIG. 10; and

FIG. 12 is a vertical section as seen from the line 12—12 of FIG. 10.

Figure 2:
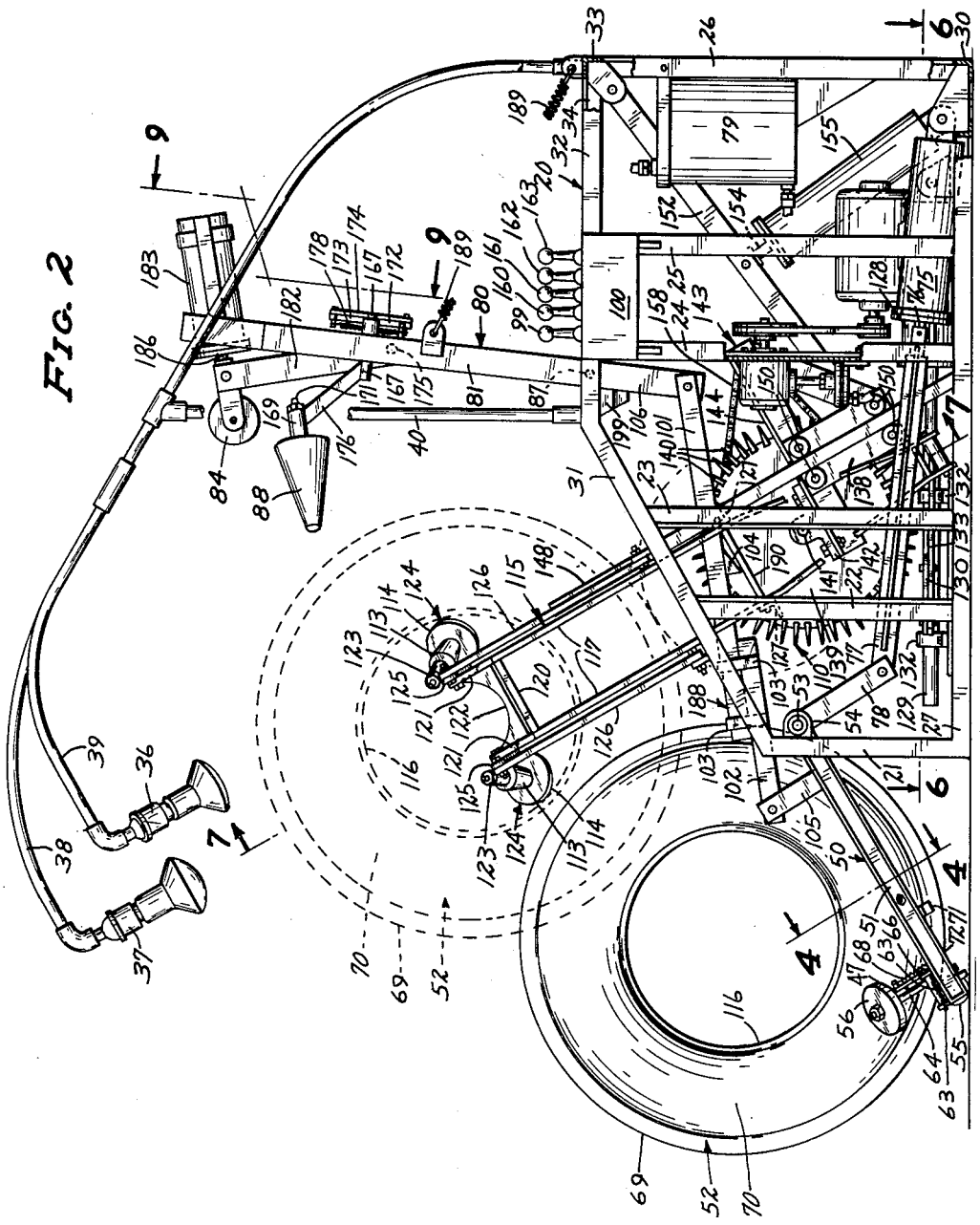
FIG. 2 is a view in side elevation corresponding to FIG. 1 but in which some parts are broken away and in which some parts are shown in section.

Referring with greater detail to the drawings, a generally rectangular frame structure is indicated in its entirety by the numeral 20 and comprises a plurality of vertical, laterally spaced, paired leg members 21, 22, 23, 24, 25 and 26, respectively (see FIGS. 1 and 2). Leg members 21 comprise the front legs and leg members 26 the rear legs. The lower ends of one of each such leg member pairs connect with one of a pair of horizontally disposed lower side frame members 27, respectively. Lower side frame members 27 connect with horizontally disposed front lower cross frame member 28 and rear lower cross frame member 30. Running lengthwise down the mid-region of frame 20 between front lower cross frame member 28 and rear lower cross frame member 30 are a pair of spaced frame support members 43 and 44. These members 43 and 44 are joined along their sides at spaced intervals by three pairs of bottom cross members 45, 29 and 46 (see FIG. 6).

A pair of diagonally disposed upper side frame members 31 connect with the upper ends of respective members of paired legs 21, 22 and 23, respectively, the legs 21 joining the front ends of members 31. The rear ends of members 31 are joined by horizontally disposed upper side frame members 32 (paired), respectively, which themselves connect with the upper ends of the remaining respective members of paired legs 24, 25 and 26, respectively, the legs 26 joining the rear ends of members 32. Horizontally disposed upper cross bar 33 joins the rear end of members 32 and legs 26 at the rear respective corners where the latter meet. A pair of horizontally disposed, spaced parallel arms 34 are connected at their respective rearward ends with upper rear cross bar 33 and are connected at their sides, immediately adjacent each forward end, with each of upper side frame members 31 and 32 respectively at about the place where the latter connect together, by a pair of opposed side extensions 35. Parallel arms 34 are joined together by middle cross bar 42 (see FIG. 5). The frame members are preferably made from cross-sectionally rectangular metal such as conventional angle iron. Additional frame members can be added if desired.

Figure 3:
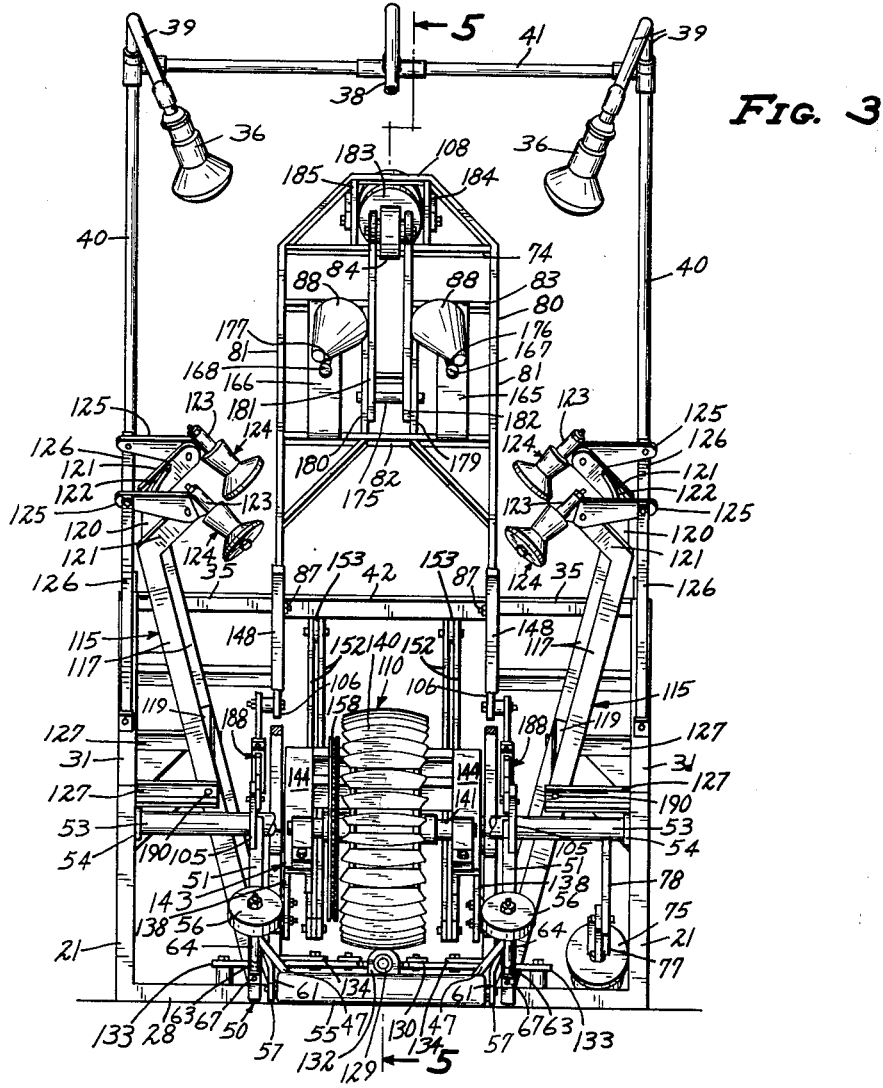
FIG. 3 is a view in front elevation corresponding to FIG. 1.

As shown in FIG. 2, a pair of light fixtures 36 are mounted at the end of a pair of tubes 39. Tubes 39 are supported at their rear ends upon cross frame member 33 and in their mid-region by support arms 40 whose bottom ends rest upon longitudinal upper side frame members 32. A third light fixture 37 connects with tube 38 which is mounted at its rearward end on a support rod 41 (see FIG. 3). Light fixtures 36 (paired), light fixture 37, tubes 39 (paired) and 38 as well as tube supports 40 and 41 are well known types and do not in themselves comprise a part of the instant invention. Hence, further detailed showing and description thereof is omitted.

The interior of the frame structure 20 is preferably enclosed by a pair of side panels (not shown) which enclose the frame sides as defined by frame members 21, 31, 32, 26 and 27, taken successively; by a top panel (not shown) which encloses the frame top as defined by frame members 32, 33, 32, 35, 42 and 35, taken successively; and by a rear panel which encloses frame members 26, 33, 26 and 30, taken successively. The notched area in the front center of the top panel is needed for machinery working space.

Figure 4:
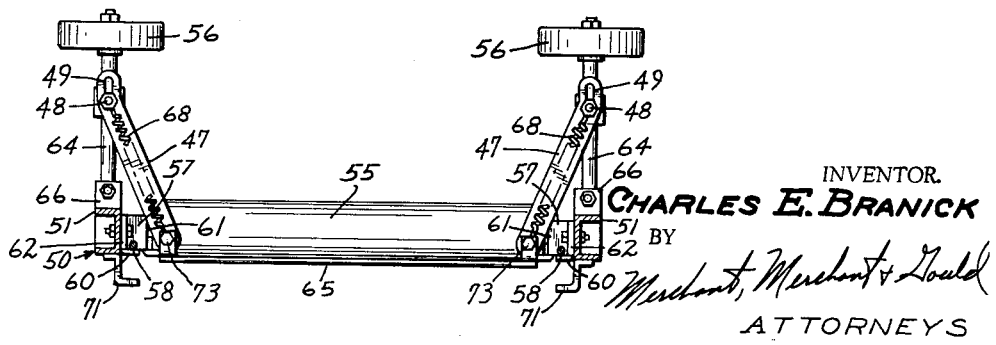
FIG. 4 is an enlarged fragmentary detail in section taken substantially along the line 4—4 of FIG. 2.

A platform, designated in its entirety by the numeral 50, is provided for raising a tire 52 from a floor level to a machine operative position (see FIGS. 1, 2 and 4). Platform 50 is composed of a pair of spaced parallel lift arms 51, an oscillatory shaft 53, a tire supporting roller 55, and a pair of tire pressure rollers 56.

Lift arms 51 are rigidly connected at their rear ends to an oscillatory shaft 53 which is journalled at each end in respective bearings 54 (paired) mounted in line with one another on the upper inner sides of each leg 21. Tire supporting roller 55 is journalled in the forward end 61 of each of a pair of trailing arms 57. The rear end 62 of each trailing arm 57 is rotatably mounted along the inner opposed side of each lift arm 51 at a corresponding position on each arm. Limited, resilient up-and-down motion, in a short arc generally normal to the plane defined by lift arms 51 and oscillatory shaft 53, is then given to tire supporting roller 55 by means of spring tempered rods 58 (paired). The rear end of each spring tempered rod 58 is held to an inner opposed side of each lift arm 51 by means of a bracket 59 (paired) which holds each spring tempered rod 58 in a position generally parallel to each adjacent lift arm 51. An ear 60 (paired) secures the forward end of each spring tempered rod 58 to the adjacent inside face of each trailing arm 57. Maximum downward movement of trailing arm 57 against the pressure of a tire 52 is then fixed by a pair of abutment members 71 attached one to the side of each lift arm 51. A tie bar 65 is mounted longitudinally of said tire supporting roller 55 between trailing arms 57 to stabilize the combined assembly of tire supporting roller 55 and trailing arms 57.

At the forward end 72 of each lift arm 51, put positioned slightly rearward of the axis of rotation of tire supporting roller 55, is mounted a tire pressure roller 56 (one on each lift arm 51). Each tire pressure roller 56 is spaced from its associated lift arm 51 by means of a cank arm 64 (paired) upon the outer end of which each tire supporting roller 56 is journalled for rotation. The inner end of each crank arm 64 is normally to the side of a rock shaft 63 (paired). Each rock shaft 63 is mounted on the top edge of each lift arm 51 by journalling each end of a rock shaft 63 is respective bearings 66 and 67 (which are secured one to each end 72 of each lift arm 51), thereby permitting each crank arm 64 to rock on an axis generally parallel to each lift arm 51.

Rocking movement of each crank arm 64 is controlled by means of a pair of guide bars 47 and a pair of coiled tension springs 68, as shown in FIG. 4. One guide bar is mounted for swinging movement on an axis parallel to that of each crank arm 64 at a post 73 (paired) mounted at each end of tie bar 65. The other end of each guide bar is appropriately shaped and slotted so that when a shaft 48 (paired) mounted along the side of each crank arm 64 slidably engages each respective slot 49, rocking movement of each crank arm 64 is limited to an acute angle extending inwards towards one another from a vertical position on each respective arm 51. Downward movement of roller 55 and tie bar 65 (as from weight of a tire 52) thus causes simultaneous, equal inward movement of each crank arm 64. Each crank arm 64 is yieldingly biased for inward (opposed) swinging movements by springs 68, each of which is tensioned between shaft 48 and end post 49. When a tie 52 is placed on platform 50, the road-engaging crown surface portions 69 of tire 52 contact tire-supporting roller 55 and oscillatory shaft 53. Tire pressure rollers 56 are brought into engagement with the tapered peripheral surfaces or side walls 70 of tire 52 by means of tire weight upon roller 55.

After a tire has been placed on platform 50 and is resting on roller 55, tire 52 is conveniently moved from the floor level to the tire inspecting position. To accomplish this, platform 50 is swung upwards about oscillatory shaft 53. The means for imparting swinging movements to said platform 50 and tire 52 between the starting or floor position to the operative position (see FIG. 2), utilizes a fluid pressure cylinder 75 whose rear end is pivotally connected to the frame 20 near one end of the bottom rear cross frame member 30. A piston-equipped plunger rod 76 extends from the forward end of cylinder 75 and is perpendicularly joined to an end of a lever arm 77. The other end of lever arm 77 pivotally connects, in turn, with an ear 78 which perpendicularly extends from rigid engagement with a side of oscillatory shaft 53 near one end thereof. Ear 78 is approximately at right angles to lift arms 51. Fluid under pressure is introduced into the lower end of cylinder 75 from a suitable source such as reservoir tank 79 through a conventional valve (not shown) and a conventional conduit (not shown). The fluid pressure system used in this invention is not described in detail herein since any suitable commercially available fluid pressure equipment can be used and the fluid pressure system by itself does not form a part of this invention. When fluid, such as air or liquid, is introduced into the cylinder 75, pressure is exerted on ear 78 through (successively) piston equipped plunger rod 76 and lever arm 77, thereby causing platform 50 to raise by an oscillatory or arcuate movement about oscillatory shaft 53 as an axis. Fluid flow is conveniently controlled by means of a switch 99 on a control box 100 (both conventional).

As platform 50 is raised, a positioning roller frame assembly, designated in its entirety by the numeral 80, is lowered. Positioning roller frame 80 is composed of a generally rectangular frame to which are attached a tire supporting roller 84 and a pair of conical rollers 88 (see FIGS. 3 and 9).

The positioning roller frame 80 itself is composed of a pair of parallel side arms 81 which are joined by three laterally spaced cross bars 82, 83 and 74. The forward ends of side arms 81 are bent inwards toward one another beyond cross bar 74 and are joined across their respective ends by a short support bar 108. Mounted parallel to one another, each an equal distance from parallel side arms 81 upon the top and bottom sides of cross bars 82 and 83, are two pairs of elongated plates 165 and 166 (see FIG. 5). In the flat mid-region of each opposed pair are journalled respective shafts 167 and 168. The forward end of each shaft 167 and 168 joins one end of respective bars 176 and 177. In turn, the other end of each bar 176 and 177 is connected to respective sleeves 169 and 170. The shaft 171 axially projecting from the base of each conical roller 88 is journalled for rotation, one in each sleeve 169 and 170. The conical rollers 88 are thus positioned to engage the side wall portions 70 of a tire 52 mounted in the apparatus of the invention, as shown, for example, in FIG. 2 or 5.

Means is provided on the reverse side of positioning roller frame 80 relative to conical rollers 88 for controlling simultaneous equal movements of the rollers 88 toward and away from side wall regions 70 of a tire positioned therebetween. This means uses a pair of spaced, generally parallel lever arms 172 and 173, one end of each arm being rigidly connected to the rear end of each respective shaft 167 and 168. The other end of each lever arm 172 and 173 is rotatably connected to the opposite ends of a connecting arm 174. Thus, the movements of the rollers 88 are ganged to one another so as to produce equal movements of each toward and away from one another. A coiled tension spring 178, mounted at one end to an end connecting arm 174 and at the other end to the positioning roller frame 80, as shown, for example, in FIG. 9, serves to yieldingly urge rollers 88 toward one another, thereby causing the rollers 88 to engage the side walls 70 of tire 52.

In positioning roller frame 80 extending between cross bars 82 and 83 are mounted a pair of spaced support arms 179 and 180. To each of arms 179 and 180 near cross bar 82, are rotatably mounted, through a common shaft 175, the ends of a pair of extender arms 181 and 182. These arms 181 and 182 are adapted to extend forward in an arcuate path from the plane of positioning roller frame 80 in the manner shown, for example, in FIG. 2 or 5. Between the opposite ends of extender arms 181 and 182 is rotatably mounted a roller 84. When conical rollers 88 are engaging the side wall portions 70 of a tire 52, the roller 84 engages the road-engaging crown surface portion 69 of the tire 52. In order to cause the roller 84 to exert pressure on the road-engaging crown surface portion 69 of tire 52, a fluid pressure cylinder 183 is mounted in the positioning roller frame 80 at the forward end thereof in the region where the side arms 81 are bent toward each other between bars 74 and 108. Conveniently, the cylinder 183 is mounted for pivotal movements between a pair of spaced parallel control struts 184 and 185 which extend from the point where support bar 108 joins the ends of side arms 81 to cross bar 74. The piston equipped plunger rod 186 of cylinder 183 pivotally connects with arms 181 and 182 behind roller 84. After the spring biased conical rollers 88 are in side wall engagement with the side walls 70 of a tire 52, the piston equipped plunger rod 186 of cylinder 183 is extended against the forward end of extender arms 181 and 182 behind roller 84, causing the roller 84 to press against the road-engaging crown surface portion 69 of tire 52. Fluid flow into cylinder 183 to extend rod 186 is controlled by a valve (not shown) from switch 163 in control box 100. Below the point where cross bar 82 connects with side arms 81 on each respective side arm 81, are positioned a pair of fulcrums 87. These fulcrums rotatably connect each side arm 81 with the adjoining respective parallel arms 34 of frame 20 at a point along the side of each arm 34 which is slightly forward of top middle cross bar 42. Thus, positioning roller frame 80 is mounted for oscillatory movements about the axis formed by opposed fulcrums 87.

As mentioned, the upward movement of platform 50 is associated with a concurrent downward movement of positioning roller frame 80. Such concurrent movement is achieved by interconnecting a lift arm 51 of platform 50 with the adjacent side arm 81 of positioning roller frame 80. To an ear 105 mounted perpendicularly on the top side of such leg 51 (spaced a short distance from oscillatory shaft 53) is rotatably attached one end of a segment 102 of a two-segment telescoping lever arm 188. The second segment 101 has one end rotatably mounted to the bottom of a leg or extension 106 of side arm 81 beneath fulcrum 87. Wrapped around segments 101 and 102 in the region where they slidably engage, are a pair of bands numbered 103, each band being rigidly connected to segment 102. Thus, as platform 50 raises, segment 102 of the telescoping lever arm 188 slidably moves along the abutting or adjacent side of segment 101 until the end of segment 102 butts up against stop 104, which is itself rigidly connected to segment 101. Thereafter, as platform 50 continues to rise, segments 101 and 102 comprising the telescoping lever arm 188 coact together as a rigid arm, causing positioning roller frame 80 to move in an arc about fulcrums 87 toward a tire 52. Platform 50 and positioning roller frame assembly 80 are caused to move towards one another until the road-engaging crown surface portions 69 of tire 52 securely engage both tire supporting rollers 55 and 84, respectively. Observe that a coiled tension spring 189 is tensioned between the mid-region of frame 80 and the top end of frame 20, so as to continuously yieldingly urge segment 101 to slide on segment 102 toward stop 104. Maximum backward movement of frame 80 is determined by the position of stop 199. The tire also touches inverting wheel 110, to be described below. At this point fluid flow into cylinder 75 from reservoir 79 is stopped by the operator using control switch 99 on control box 100.

A modification of positioning roller frame 80 is shown in FIGS. 10 to 12. Here, a positioning roller frame assembly 201 is composed of a pair of parallel side arms 202, a lower cross bar 203 and an upper cross bar 204. Side arms 202 and cross bars 203 and 204 form a generally rectangularly shaped rigid frame. Slightly below upper cross bar 204, a tire supporting roller 205 is journalled in the upper end 206 of each of a pair of rocker arms 207. The lower end 208 of each rocker arm 207 is rotatably mounted on the side of each side arm 202, the ends 208 being opposite one another. Tire supporting roller 205 is thus mounted for arcuate swinging movements at the forward end of positioning roller frame 201.

A pair of abutment members 209, secured at a corresponding point on the front edge of each side arm 202 prevents excessive forward swinging of tire supporting roller 205. A tie bar 210 extends between, and interconnects, the upper ends 206 of each respective rocker arm 207 so as to stabilize tire supporting roller 205 and its associated rocker arms 207 in relation to frame 201. Positioned for rotational movements toward and away from the center of positioning roller frame 201 adjacent the front end of each side arm 202, is a pair of tire pressure rollers 211 (one mounted from each side arm 202). Each tire pressure roller 211 is journalled upon a crank arm 212. Each crank arm 212 has its opposite end connected generally normally to a rock shaft 216 (paired). Each rock shaft 216 is mounted for oscillatory axial movements generally parallel to side arms 202 upon bearings 213 and 214 (each paired), bearings 213 projecting through the cross bar 202 and bearings 213, 214 being secured to ears 215 (paired) perpendicularly mounted upon, and projecting inwardly from, respective side arms 202. Thus, tire pressure rollers 211 can rock in a plane generally perpendicular to each side arm 202.

Behind each crank arm 212 on each rock shaft 216 is perpendicularly mounted a post 217 (see FIG. 11) which serves as an anchor for a coil tension spring 218, which is mounted under tension between the posts 217. This coil tension spring 218 yieldingly urges tire pressure rollers 211 apart. A pair of linkages 219 at their ends interconnect the forward region of each crank arm 212 (behind tire pressure rollers 211) with the end region of tie bar 210, such linkage being rotatably mounted at each end on crank arms 212 and tie bar 210. As a result, when a tire 52 is pressured against the tire supporting roller 205, the tire pressure rollers 211 are moved against the respective side walls 70 of tire 52.

Positioning roller frame assembly 201 is mounted on frame 20 and connected to platform 50 in a manner similar to that used for positioning roller frame 80.

Once a tire 52 is positioned between tire supporting roller 84 and tire supporting roller 56, a pair of bead spreader arm assemblies, herein each designated in its entirety by the numeral 115, are engaged with the beads 116 (paired) of tire 52. Each spreader arm assembly 115 uses a pair of legs 117 generally vertically positioned in laterally spaced relationship to one another, one spreader arm being on each side of tire 52. Each leg 117 is joined to its mate by means of bottom cross brace 118, middle cross brace 119 and top cross brace 120. Between middle cross brace 119 and bottom cross brace 118, legs 117 are bent inward toward one another so that the distance between the opposed side surfaces of each leg 117 is considerably less in the bottom portion than it is in the top portion. Rigidly attached to the head end of each leg 117 is an arm 121 (two pairs) set at an angle with respect to each leg 117. Each arm 121 is braced in place by an arcuate cross member 122 which also tangentially connects with cross brace 120 in its mid-region. The head end of each arm 121 is rotatably connected with one end of a linkage 125 (two pairs), whose other end is rotatably connected to one end of a lever arm 126 (two pairs). The other end of each pair of lever arms 126 rotatably connects with diagonal side frame members 31 of frame 20. Just below middle cross brace 119, each leg 117 of a spreader arm assembly 115 is rotatably mounted on a shaft 190 (paired) which is journalled at its end regions in supports 127 (two pairs). Supports 127 are mounted on frame 20.

Each linkage 125 protrudes beyond the end of each arm 121 and has mounted on such protrusion a bearing 123 in which is journalled the shaft of a bead-engaging roller 124. Each bead-engaging roller 124 (two pairs) comprises a pair of opposed frusto-conical sections 113—114, each axially rotatably mounted on its respective shaft. The forward frusto-conical section 114 has a considerably larger base diameter than that of the rearward frusto-conical section 113. With the above described structure 115, there is formed a parallelogram arrangement by which, when the bottom of a spreader assembly 115 is moved toward or away from the plane of the tire 52, the respective bead-engaging rollers 124 are caused to move outward or inward, as the case may be, toward tire 52. Each spreader arm assembly 115, positioned on each side of tire 52, is mounted so as to cause each bead-engaging roller 124 to be equidistant from a plane passing normally through the tire along its vertical diameter.

The means for moving the bottom of each spreader arm assembly 115 laterally is shown in FIG. 6. A fluid pressure cylinder 128 whose bottom or rear is pivotally connected to the frame 20 near the middle of the bottom rear cross frame member 30 on frame members 43 and 44, has its piston-equipped plunger rod 129 journalled in bearings 132 which are secured to a stage 131 fast on the frame members 43 and 44. On the lateral sides of plunger rod 129 at points opposite one another are rotatably mounted a pair of links 130 (one on each side). The other end of each link 130 is pivotally connected with the end of one arm of each of a pair of bellcranks 133. In turn, the end of the other arm of bellcrank 133 is pivotally connected to one end of a link 134 (paired). Finally, the other end of each link 134 is pivotally connected with the base of each spreader arm assembly 115. The position of the assembly as shown in FIG. 6 corresponds to the position of the spreader arms in FIG. 3. When piston-equipped plunger rod 129 is extended, the bead-engaging heads 124 are opened or spread laterally, and vice versa. In this arrangement legs 117 act as operating means and lever arms 126 act as control means for together maintaining a definite angular relationship between bead-engaging heads 124 and beads 116 of tire 52.

A procedure when engaging the bead-engaging heads 124 with the beads 116 of a tire 52, once a tire is mounted, is as follows: The bead-engaging rollers 124 are initially moved apart, as a tire 52 is mounted, by extending the piston-equipped plunger rod 129 by introducing fluid into the lower end of cylinder 158. Fluid flow is controlled from box 100 by lever 160. After tire 52 is mounted, the heads 124 are brought together by means of retracting the piston-equipped plunger rod 129 (see FIG. 7 for the final position). Next, the tire is inverted by inverting wheel 110.

The tire inverting wheel 110 is composed of a pair of laterally spaced circular discs 139 joined together by a plurality of circumferentially spaced, radially positioned leaves 140, each of whose exterior edges is slightly convexly shaped. This inverting wheel 110 is axially mounted on a shaft 141, the ends of which are journalled in bearings 142 (paired). In turn, the bearings are mounted upon a generally U-shaped inverting wheel frame, herein designated in its entirety by the numeral 143.

The inverting wheel frame 143 has a platform composed of a pair of arm members 144 which are laterally spaced from, and joined to one another by a pair of cross members at their rear ends thereof, and a pair of vertically positioned side plates 138 depending from and fast to the side rails 144. Each side plate 138 of this inverter wheel frame 143 is positioned adjacent a spaced, parallel rail 148 (one on the outside of each side 138). Each side plate 138 has four wheels 150 positioned as two pairs one on each side of a rail 148, and each wheel 150 is journalled for rotation on an axis perpendicular to plate 138. Thus the entire inverting wheel frame can ride up or down on the rails 148 in linear motion.

The inverting wheel 110 with its shaft 141 and bearings 142 is mounted near the front of this frame assembly 143. Mounted at the rear of the inverting wheel frame 143 is a fluid actuated motor 156 for driving (i.e., causing to rotate) the inverting wheel 110. This fluid-actuated motor is operated using the same fluid as in reservoir 79. Its drive shaft turns sprocket chain 158, and chain 158 in turn engages and turns a sprocket wheel 157 which is mounted on the axis of inverter wheel 110. A step-down sprocket configuration is used. Flexible hoses (not shown) deliver fluid to and from the motor from reservoir 79. Thus, as the inverting wheel frame rides up and down on the rails 148, the inverting wheel 110 can be rotated, if desired, independently of the position of frame 143 on the rails 148.

The means for selectively controlling up-and-down movement of the inverting wheel 110 is as follows: Secured to each side of the inverting wheel frame 143 is a pair of linkages 151, one end of each of which is rotatably mounted on the frame 143. The other end of each such linkage 151 is rotatably connected to one end of a lever arm 152 (paired). In turn, the other end of each lever arm 152 is rotatably connected to each of a pair of ears 153, which are each fastened to the top rear mid-region of the frame 20 along cross bar 33. At approximately in the middle of lever arm 152 is rotatably connected the piston-equipped plunger rod 154 of a fluid-pressure cylinder 155. Fluid-pressure cylinder 155 itself has its base pivotally connected to the frame 20 along cross member 30. (See FIG. 5). As the piston-equipped plunger rod 129 is extended, the lever arm 152 moves upward and causes the entire inverter wheel frame assembly, composed of the inverter wheel 110, shaft 141, bearings 142, inverting wheel frame 143, fluid-actuated motor 156, etc., to ride upward along the rails 148.

After a tire 52 is in position over the inverting wheel 110, and the bead spreading or engaging heads 124 are in the position shown in FIG. 7, then the inverting wheel 110 is raised so as to move the entire tire 52 upward until the beads 116 of the tire 52 engage each of the four bead-engaging heads 124. Thereafter, the head ends of each spreader arm assembly 115 are moved away from each other, thereby spreading tire beads 116 of tire 52 into the position desired for examination.

The procedure when inverting a tire after the bead-engaging rollers have spread the beads of the tire, is to simply raise or move the inverting wheel frame 143 upward, causing the inverting wheel 110 itself to depress the road-engaging crown surface portion 69 of tire 52, thereby inverting the same.

Thus, to use the apparatus of the invention, an operator rolls a tire onto platform 50 and energizes control switch 99. Platform 50 raises the tire in a vertical position, while positioning roller frame assembly (either embodiment 80 or embodiment 201) is simultaneously moved. Platform 50 and the tire positioning roller frame 80 move toward one another until the road-engaging crown surface portions of the tire to be inspected are gripped between the tire supporting roller on platform 50 and that on the positioning roller frame assembly. The movement of the platform 50 and the positioning roller frame assemblies is such that, in general, the line joining the axes of the tire being examined and the inverting wheel 110 bisects the angle formed by platform 50 and the positioning roller frame assembly. Next, the bead-engaging rollers are moved to the position shown generally in FIGURE 7. Thereafter, the tire to be examined is moved upward into engagement with the bead engaging rollers (as shown by the dotted lines in FIG. 7) by means of raising inverting wheel 110. The tire beads engage the bead-engaging rollers and upward movement of the inverting wheel is for the moment stopped, preferably. The beads of the tire are spread, and the road-engaging crown surface inverting can be carried out simultaneously. The tire can now be rotated by means of rotating the inverting wheel. Movement of the bead-engaging rollers is controlled by switch 160, while linear movement of the inverting wheel 110 is controlled by switch 161. Rotational movement of the inverting wheel is controlled by switch 162.

At any point during tire inspection, rotation of the tire can be stopped by ceasing rotation of the inverting wheel 110, as for marking, skiving, buffing, or the like. Following a tire inspection, the tire is disengaged from the inspection apparatus by following the reverse procedure to that employed in the described mounting procedure.

The means for supporting and automatically positioning a tire in a tire inspection device of the class described consists more particularly of hoisting means pivotally attached to said frame structure for lifting a tire in a vertical position from a floor level to a machine operative position, tire-supporting means pivotally attached to said frame structure which cooperates with said hoisting means for positioning and supporting a tire casing in a machine operative position so that the tire inverting wheel can engage the crown surface portions of the tire adjacent the bead spreading means, and lever means for imparting simultaneous swinging movements to said hoisting means and said supporting means so as to cause said hoisting means and said supporting means to position a tire casing for operative engagement with the crown surface portions of the tire.

In summary then, the present machine for inspecting pneumatic tire casings consists of (a) a frame structure, (b) hoisting means pivotally attached to said frame structure for raising a tire casing in a vertical position from a floor level to a machine operative position, (c) positioning means attached to said frame structure which cooperates with said hoisting means to support and position a tire casing in a machine operative position, (d) two pairs of opposed tire bead-engaging rollers, each pair spaced laterally from the other adjacent rollers and being mounted for movements in directions radially and axially with respect to a tire casing mounted in said machine so as to maintain each of said rollers during such movements at a positive, independent desired optimum angle of inclination towards the beads of said tire casing at each possible bead position, (e) an inverting wheel positioned between each pair of said rollers for inverting a tire casing and for imparting rotation to a tire casing on its own axis relative to said bead-engaging elements, said inverting wheel being adapted for axial rotation and for reciprocatory radial movement toward and away from the road-engaging crown surface portion of a tire casing.

The means for mounting the tire spreading rollers at the desired attitude towards tire beads can be more particularly described as comprising (a) at least one pair of opposed bead-engaging rolls, each of said rolls including a generally cylindrical portion engageable with the inner generally cylindrical surface of a tire bead and a generally radially projecting circumferential flange engageable with the inner wall surface of a tire at the bead portion thereof, (b) a pair of mounting heads each journalling a different one of said rolls for rotation on axes extending in directions generally axially of the tire, a pair of generally upstanding operating arms pivotally mounted at their lower end portions on opposite side portions of said frame structure on parallel axes generally normal to the axis of the tire, said heads being mounted to the upper end portions of respective ones of said arms on axes parallel to the axes of pivotal movement of said arms, (c) means for imparting swinging movements to said arm and rolls carried thereby in directions to spread the beads of the tire, (d) a pair of control arms one each pivotally mounted at one end to an opposite portion of the frame structure for swinging movements on axes parallel to the axes of swinging movement of said operating arms, the other ends of said control arms being pivotally secured to a respective one of said heads on axes parallel to the axes of swinging movements of said arms, and (e) means for moving said inverting wheel toward and away from operative engagement with said crown portions of the tire.

While I have shown and described a commercial embodiment of my tire inverting machine, and certain modifications thereof, it will be understood that the same is capable of further modification and that all such modifications may be and are made without departures from the spirit and scope of my invention, as defined in the claims.

The claims are:

1. In a device for inspecting pneumatic tire casings, the combination comprising a frame structure, means for supporting a tire in said frame structure including a tire-inverting wheel positioned to underlie a segment of the road-engaging crown portion of the tire, means for spreading the bead portions of the tire adjacent said inverting wheel, said means comprising at least one pair of opposed bead-engaging rolls, each of said rolls including a generally cylindrical portion engageable with the inner generally cylindrical surface of a tire bead, and a generally radially projecting circumferential flange engageable with the inner wall surface of a tire at the bead portion thereof, a pair of mounting heads each journalling a different one of said rolls for rotation on axes extending in directions generally axially of the tire, a pair of generally upstanding operating arms pivotally mounted at their lower end portions on opposite side portions of said frame structure on parallel axes generally normal to the axis of the tire, said heads being mounted to the upper end portions of respective ones of said arms on axes parallel to the axes of pivotal movement of said arms, means for imparting swinging movements to said arms and rolls carried thereby in directions to spread the beads of the tire, a pair of control arms one each pivotally mounted at one end to an opposite portion of the frame structure for swinging movements on axes parallel to the axes of swinging movement of said operating arms, the other ends of said control arms each being pivotally secured to a respective one of said heads on axes parallel to the axes of swinging movements of said arms, and means for moving said inverting wheel toward and away from the axis of a tire in overlying relationship thereto and in engagement therewith.

2. In a device for inspecting pneumatic tire casings containing the combination of a frame structure, means for supporting a tire in said frame structure including a tire inverting wheel, equipped with rotational means and positioned to underlie the road-engaging crown portions of the tire, means for spreading the bead portions of the tire adjacent said inverting wheel and means for moving said inverting wheel toward and away from the axis of a tire in overlying relationship thereto and in engagement therewith, said spreading means comprising:
 (a) opposed bead engaging rolls wherein each of said rolls includes a generally cylindrical portion engageable with the inner generally cylindrical surface of a tire bead, and an associated generally radially projecting circumferential flange engageable with the inner wall surface of a tire at the bead portion thereof,
 (b) a pair of mounting heads each journalling a different one of said bead engaging rolls for rotation on axes extending in directions generally axially of the tire,
 (c) a pair of generally upstanding operating arms pivotally connected at their lower end portions on opposite side portions of said frame structure on parallel axes generally normal to the axis of the tire, said heads being mounted to the upper end portions of respective ones of said arms on axes parallel to the axes of pivotal movement of said arms,
 (d) means for imparting swinging movements to said arms and rolls carried thereby in directions to spread and release the beads of the tire, and
 (e) a pair of control arms one each pivotally mounted at one end to an opposite portion of the frame structure for swinging movements on axes parallel to the axes of swinging movement of said operating arms, the other ends of said control arms each being pivotally secured to a respective one of said mounting heads on axes parallel to the axes of swinging movements of said arms.

3. Improvements in devices for inspecting pneumatic tire casings, which devices include in combination a frame, a tire inverting wheel mounted for rotation on a horizontal axis in said frame, means for positioning a tire casing in a vertical position in overlying relation to and in engagement with said inverting wheel, spreader means engageable with the beads of a tire and limiting raising movements of said beads during engagement thereof, and means for raising and lowering said inverting wheel with respect to the axis of a tire casing in engagement therewith, said improvements comprising:
 (a) said positioning means including platform means pivotally attached to said frame structure, lifting means connected to said platform means for lifting a vertically disposed tire casing from a floor level forwardly of said inverting wheel to a position generally overlying said wheel and with a portion of the crown thereof in engagement with said wheel,
 (b) first tire casing stabilizing means associated with said platform lifting means and responsive to initial hoisting movements thereof to engage said tire radially inwardly from the crown portion thereof to retain said tire casing in said vertical position, and
 (c) second tire casing stabilizing means independent of said platform lifting means carried by said frame rearwardly of said inverting wheel and mounted thereon for movements toward and away from said tire casing and responsive to final movements of said platform lifting means to move into operative engagement with said tire casing.

4. The structure defined in claim 3 in which said platform means comprises:
 (a) a pair of laterally spaced cradle-forming lifting arms pivotally secured to said frame at their rear ends,
 (b) the forward end portions of said lifting arms being connected together by means of a U-shaped bail member, the opposite side portions of which are pivotally connected at their rear ends to the intermediate portion of one of said arms for limited swinging movements of the forward end thereof,
 (c) said forward end of said U-shaped bail member terminating in a transverse tire-supporting roller,
 (d) a pair of roller-supporting arms pivotally secured one each to the forward end of one each of said lifting arms for pivotal swinging movements of the rollers carried thereby toward and away from each other,
 (e) linkage connecting said roller-supporting arms to the outer end portion of said U-shaped bail member and responsive to downward swinging movements of said bail member to impart inward tire-side-wall-engaging movements of said roller-supporting arms, and
 (f) means limiting downward movements of said U-shaped bail member.

5. The structure defined in claim 3 in which the second tire casing stabilizing means comprises:
 (a) a pair of rocker arms pivotally secured to said frame on aligned horizontal axes for swinging movements of the upper free ends thereof toward and away from a tire casing supported by said tire inverting wheel,
 (b) a horizontally disposed tire crown engaging roller pivotally secured to the upper end portions of said rocker arms for limiting swinging movements about a horizontal axis,
 (c) a pair of roller-supporting arms secured one each to the upper end portion of one each of said rocker arms for pivotal swinging movements of the rollers carried thereby toward and away from each other,
 (d) linkage operatively connecting said roller-supporting arms to said tire-engaging roller and responsive to pressure exerted by said tire-engaging roller on the crown of a tire casing by said rocker arms to impart tire-side-wall-engaging movements to said roller-supporting arms, and
 (e) means biasing said roller-supporting arms away from each other.

6. The structure defined in claim 5 in further combination with means positively limiting movements of said roller-supporting arms away from each other.

7. The structure defined in claim 5 in further combination with means yieldingly biasing the upper end portions of said rocker arms and parts carried thereby away from a tire casing in engagement with said inverter wheel.

References Cited in the file of this patent

UNITED STATES PATENTS

| | | |
|---|---|---|
| 2,375,595 | Stoehr | May 8, 1945 |
| 3,044,748 | Branick | July 17, 1962 |